United States Patent
Choi et al.

(10) Patent No.: US 9,636,662 B2
(45) Date of Patent: May 2, 2017

(54) CATALYST TO ATTAIN LOW SULFUR GASOLINE

(75) Inventors: Ki-Hyouk Choi, Dhahran (SA); Sameer Ali Al-Ghamdi, Dhahran (SA); Ali H. Al-Shareef, AlNasira-Qatif (SA); Ali H. Al-Hamadah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 769 days.

(21) Appl. No.: 12/390,706

(22) Filed: Feb. 23, 2009

(65) Prior Publication Data
US 2009/0230026 A1  Sep. 17, 2009

Related U.S. Application Data

(60) Provisional application No. 61/030,352, filed on Feb. 21, 2008.

(51) Int. Cl.
| | |
|---|---|
| *B01J 21/08* | (2006.01) |
| *B01J 21/18* | (2006.01) |
| *B01J 23/26* | (2006.01) |
| *B01J 23/28* | (2006.01) |
| *B01J 23/30* | (2006.01) |
| *B01J 23/882* | (2006.01) |
| *B01J 23/24* | (2006.01) |
| *B01J 23/652* | (2006.01) |
| *B01J 23/85* | (2006.01) |
| *B01J 37/02* | (2006.01) |
| *B01J 37/20* | (2006.01) |
| *C10G 45/04* | (2006.01) |
| *C10G 45/08* | (2006.01) |
| *B01J 23/883* | (2006.01) |
| *B01J 35/10* | (2006.01) |

(52) U.S. Cl.
CPC ............ *B01J 23/882* (2013.01); *B01J 21/18* (2013.01); *B01J 23/24* (2013.01); *B01J 23/652* (2013.01); *B01J 23/85* (2013.01); *B01J 37/0201* (2013.01); *B01J 37/20* (2013.01); *C10G 45/04* (2013.01); *C10G 45/08* (2013.01); *B01J 23/28* (2013.01); *B01J 23/883* (2013.01); *B01J 35/1028* (2013.01); *B01J 35/1061* (2013.01); *B01J 37/0236* (2013.01)

(58) Field of Classification Search
CPC ........ B01J 37/0201; B01J 37/20; B01J 23/24; B01J 23/28; B01J 23/652; B01J 23/85; B01J 23/882; B01J 23/883; B01J 21/18; B01J 23/88; B01J 23/6525; C10G 45/04; C10G 45/06; C10G 45/08
USPC ....... 502/182, 254, 255, 256, 305, 313, 315, 502/316, 319, 321; 423/141; 208/216 R
See application file for complete search history.

(56) References Cited

U.S. PATENT DOCUMENTS

| | | | |
|---|---|---|---|
| 2,880,171 A | 3/1959 | Flinn et al. | |
| 2,944,012 A | 7/1960 | Thompson | |
| 2,967,204 A | 1/1961 | Beuther et al. | |
| 3,116,234 A | 12/1963 | Douwes et al. | |
| 3,501,396 A | 3/1970 | Gatsis | |
| 3,576,596 A | 4/1971 | Krane et al. | |
| 3,586,621 A | 6/1971 | Pitchford et al. | |
| 3,654,139 A | 4/1972 | Winsor et al. | |
| 3,733,259 A | 5/1973 | Wilson et al. | |
| 3,830,752 A | 8/1974 | Mickelson | |
| 3,841,995 A * | 10/1974 | Bertolacini et al. | ............ 208/89 |
| 3,842,014 A | 10/1974 | Friend et al. | |
| 3,864,451 A | 2/1975 | Lee et al. | |
| 3,948,754 A | 4/1976 | McCollum et al. | |
| 3,948,755 A | 4/1976 | McCollum et al. | |
| 3,960,706 A | 6/1976 | McCollum et al. | |
| 3,960,708 A | 6/1976 | McCollum et al. | |
| 3,988,238 A | 10/1976 | McCollum et al. | |
| 3,989,618 A | 11/1976 | McCollum et al. | |
| 4,005,005 A | 1/1977 | McCollum et al. | |
| 4,082,695 A | 4/1978 | Rosinski et al. | |
| 4,151,068 A | 4/1979 | McCollum et al. | |
| 4,203,829 A | 5/1980 | Bertolacini | |
| 4,210,628 A | 7/1980 | Ninomiya et al. | |
| 4,325,926 A | 4/1982 | Blanton, Jr. | |
| 4,333,854 A * | 6/1982 | Antos | ........................ 502/174 |

(Continued)

FOREIGN PATENT DOCUMENTS

| | | |
|---|---|---|
| EP | 0341893 A | 11/1989 |
| EP | 1454976 | 9/2004 |

(Continued)

OTHER PUBLICATIONS

Kouzu et al., "Catalytic potential of carbon-supported Ni—Mo-sulfide for ultra-deep hydrodesulfurization of diesel fuel," Applied Catalysis A: General 265 (2004) 61-67.
Pawelec et al., "Carbon-supported tungsten and nickel catalysts for hydrodesulfurization and hydrogenation reactions," Applied Catalysis A: General 206 (2001) 295-307.
Farag et al., "Carbon versus alumina as a support for Co—Mo catalysts reactivity towards HDS of dibenzothiophenes and diesel fuel," Catalysis Today 50 (1999) 9-17.
Examination Report issued in EP Patent Application No. EP09713538.8, dated Dec. 22, 2011 (5 pages).

(Continued)

*Primary Examiner* — Jun Li
(74) *Attorney, Agent, or Firm* — Bracewell LLP; Constance G. Rhebergen; Brian H. Tompkins

(57) ABSTRACT

This invention relates to a hydrodesulfurization catalyst, a method for preparing the catalyst, and a method for the preparation of low sulfur gasoline fuel with minimal loss of RON. The catalyst particles include a group VIB metal and a support material having relatively high surface area, and optionally includes one or more group VIIIB metal. The method for preparing the catalyst allows for greater loading of the active metal species on the surface of the support material under aqueous reaction conditions.

8 Claims, No Drawings

(56) References Cited

U.S. PATENT DOCUMENTS

| | | | |
|---|---|---|---|
| 4,464,252 A | 8/1984 | Eberly, Jr. | |
| 4,483,761 A | 11/1984 | Paspek, Jr. | |
| 4,485,007 A | 11/1984 | Tam et al. | |
| 4,530,755 A | 7/1985 | Ritchie et al. | |
| 4,544,481 A | 10/1985 | Seiver et al. | |
| 4,594,141 A | 6/1986 | Paspek, Jr. et al. | |
| 4,719,000 A | 1/1988 | Beckberger | |
| 4,743,357 A | 5/1988 | Patel et al. | |
| 4,762,814 A | 8/1988 | Parrott et al. | |
| 4,813,370 A | 3/1989 | Capamaggio | |
| 4,818,370 A | 4/1989 | Gregoli et al. | |
| 4,840,725 A | 6/1989 | Paspek | |
| 4,908,122 A | 3/1990 | Frame et al. | |
| 5,087,350 A | 2/1992 | Paris-Marcano | |
| 5,096,567 A | 3/1992 | Paspek, Jr. et al. | |
| 5,167,797 A | 12/1992 | Ou | |
| 5,278,138 A | 1/1994 | Ott et al. | |
| 5,316,659 A | 5/1994 | Brons et al. | |
| 5,411,658 A * | 5/1995 | Chawla et al. | 208/89 |
| 5,421,854 A | 6/1995 | Kodas et al. | |
| 5,439,502 A | 8/1995 | Kodas et al. | |
| 5,466,363 A | 11/1995 | Audeh et al. | |
| 5,529,968 A | 6/1996 | Sudhakar et al. | |
| 5,538,930 A | 7/1996 | Sudhakar et al. | |
| 5,558,783 A | 9/1996 | McGuinness | |
| 5,597,476 A | 1/1997 | Hearn et al. | |
| 5,611,915 A | 3/1997 | Siskin et al. | |
| 5,616,165 A | 4/1997 | Glicksman et al. | |
| 5,676,822 A | 10/1997 | Sudhakar | |
| 5,695,632 A | 12/1997 | Brons et al. | |
| 5,837,640 A | 11/1998 | Sudhakar et al. | |
| 5,851,381 A | 12/1998 | Tanaka et al. | |
| 5,861,136 A | 1/1999 | Glicksman et al. | |
| 5,906,730 A | 5/1999 | Hatanaka et al. | |
| 5,928,497 A | 7/1999 | Iaccino | |
| 5,958,224 A | 9/1999 | Ho et al. | |
| 6,063,265 A | 5/2000 | Chiyoda et al. | |
| 6,103,393 A | 8/2000 | Kodas et al. | |
| 6,120,679 A | 9/2000 | Hatanaka et al. | |
| 6,153,123 A | 11/2000 | Hampden-Smith et al. | |
| 6,159,267 A | 12/2000 | Hampden-Smith et al. | |
| 6,162,351 A * | 12/2000 | Sudhakar et al. | 208/216 PP |
| 6,197,718 B1 | 3/2001 | Brignac et al. | |
| 6,228,254 B1 | 5/2001 | Jossens et al. | |
| 6,248,230 B1 | 6/2001 | Min et al. | |
| 6,277,271 B1 | 8/2001 | Kocal | |
| 6,303,020 B1 | 10/2001 | Podrebarac et al. | |
| 6,316,100 B1 | 11/2001 | Kodas et al. | |
| 6,325,921 B1 | 12/2001 | Andersen | |
| 6,334,948 B1 | 1/2002 | Didillon et al. | |
| 6,488,840 B1 | 12/2002 | Greaney et al. | |
| 6,500,219 B1 | 12/2002 | Gunnerman | |
| 6,551,501 B1 | 4/2003 | Whitehurst | |
| 6,579,444 B2 | 6/2003 | Feimer et al. | |
| 6,596,157 B2 | 7/2003 | Gupta et al. | |
| 6,610,197 B2 | 8/2003 | Stuntz et al. | |
| 6,623,627 B1 | 9/2003 | Zhou | |
| 6,685,762 B1 | 2/2004 | Brewster et al. | |
| 6,689,186 B1 | 2/2004 | Hampden-Smith et al. | |
| 6,699,304 B1 | 3/2004 | Hampden-Smith et al. | |
| 6,780,350 B1 | 8/2004 | Kodas et al. | |
| 6,827,845 B2 | 12/2004 | Gong et al. | |
| 6,881,325 B2 | 4/2005 | Morris et al. | |
| 7,264,710 B2 | 9/2007 | Hokari et al. | |
| 7,435,330 B2 | 10/2008 | Hokari et al. | |
| 7,780,847 B2 | 8/2010 | Choi | |
| 7,842,181 B2 | 11/2010 | Choi | |
| 2003/0062163 A1 | 4/2003 | Moulton et al. | |
| 2003/0217952 A1 | 11/2003 | Brignac et al. | |
| 2004/0007506 A1 | 1/2004 | Song et al. | |
| 2004/0024072 A1 | 2/2004 | Lin et al. | |
| 2004/0118748 A1 | 6/2004 | Lesemann et al. | |
| 2004/0178123 A1 | 9/2004 | Podrebarac | |
| 2004/0188327 A1 | 9/2004 | Groten | |
| 2005/0040078 A1 | 2/2005 | Zinnen et al. | |
| 2005/0067323 A1 | 3/2005 | Balko | |
| 2005/0072137 A1 | 4/2005 | Hokari et al. | |
| 2005/0075528 A1 | 4/2005 | Burkhardt et al. | |
| 2005/0098478 A1 | 5/2005 | Gupta et al. | |
| 2005/0173297 A1 | 8/2005 | Toida | |
| 2005/0197249 A1 * | 9/2005 | Creyghton | B01J 23/888 502/439 |
| 2005/0252831 A1 | 11/2005 | Dysard et al. | |
| 2005/0284794 A1 * | 12/2005 | Davis et al. | 208/89 |
| 2006/0011511 A1 | 1/2006 | Hokari et al. | |
| 2006/0154814 A1 | 7/2006 | Zanibelli et al. | |
| 2006/0163117 A1 | 7/2006 | Hong | |
| 2007/0111319 A1 | 5/2007 | Bastide et al. | |
| 2007/0135300 A1 * | 6/2007 | Kagami | B01J 23/85 502/208 |
| 2007/0234640 A1 | 10/2007 | Jia et al. | |
| 2008/0099373 A1 | 5/2008 | Hokari et al. | |
| 2008/0099374 A1 | 5/2008 | He et al. | |
| 2008/0099375 A1 | 5/2008 | Landau et al. | |
| 2008/0099376 A1 | 5/2008 | He et al. | |
| 2008/0099377 A1 | 5/2008 | He et al. | |
| 2008/0099378 A1 | 5/2008 | He et al. | |
| 2008/0242894 A1 * | 10/2008 | Hasenberg et al. | 568/61 |
| 2009/0032436 A1 | 2/2009 | Takahashi et al. | |
| 2009/0145807 A1 | 6/2009 | Choi et al. | |
| 2009/0145808 A1 | 6/2009 | Choi et al. | |
| 2009/0148374 A1 | 6/2009 | Choi | |
| 2011/0024330 A1 | 2/2011 | Choi | |

FOREIGN PATENT DOCUMENTS

| | | |
|---|---|---|
| EP | 1577007 A | 9/2005 |
| EP | 1923452 | 5/2008 |
| FR | 2913235 | 9/2008 |
| GB | 1098698 | 1/1968 |
| JP | 07-265689 | 10/1995 |
| JP | 2000282063 | 10/2000 |
| JP | 2001019984 | 1/2001 |
| JP | 2001192676 | 7/2001 |
| JP | 2003049180 | 2/2003 |
| JP | 2003277770 | 10/2003 |
| JP | 2005015533 | 1/2005 |
| WO | WO9600269 | 1/1996 |
| WO | WO9967345 | 12/1999 |
| WO | WO0179391 | 10/2001 |
| WO | WO02053684 | 7/2002 |
| WO | WO2005005582 | 1/2005 |
| WO | WO2007015391 | 2/2007 |
| WO | WO2009070561 | 6/2009 |

OTHER PUBLICATIONS

Arturo J. Hernandez and Ralph T. Yang, "Desulfurization of Transportation Fuels by Adsorption", Catalysis Reviews (2004), pp. 111-150, vol. 46, No. 2.

Y. Sano, K.H. Choi, Y. Korai, I. Mochida, "Selection and Further Activation of Activated Carbons for Removal of Nitrogen Species in Gas Oil as a Pretreatment for Its Deep Hydrodesulfurization", Energy & Fuels (2004), pp. 644-651, vol. 18.

Y. Sano, K. Sugahara, K.H. Choi, Y. Korai, I. Mochida, "Two-step adsorption process for deep desulfurization of diesel oil", Fuel (2005), pp. 903-910, vol. 84, Elsevier Ltd.

Y. Sano, K. Choi, Y. Korai, I. Mochida, "Adsorptive removal of sulfur and nitrogen species from a straight run gas oil for its deep hydrodesulfurization", American Chemical Society, Fuel Chemistry Division Preprints (2003), vol. 48(1), pp. 138-139.

Y. Sano, K. Choi, Y. Korai, I. Mochida, "Adsorptive removal of sulfur and nitrogen species from a straight run gas oil over activated carbons for its deep hydrodesulfurization", Applied Catalysis B: Environmental (2004), vol. 49, pp. 219-225.

Y. Sano, K. Choi, Y. Korai, I. Mochida, "Effects of nitrogen and refractory sulfur species removal on the deep HDS of gas oil", Applied Catalysis B: Environmental (2004), vol. 53, pp. 169-174.

K. Choi, N. Kunisada, Y. Korai, I. Mochida, K. Nakano, "Facile ultra-deep desulfurization of gas oil through two-stage or -layer catalyst bed", Catalysis Today (2003), vol. 86, pp. 277-286.

(56) References Cited

OTHER PUBLICATIONS

K. Choi, Y. Korai, I. Mochida, J. Ryu, W. Min, "Impact of removal extent of nitrogen species in gas oil on its HDS performance: an efficient approach to its ultra deep desulfurization", Applied Catalysis B: Environmental (2004), vol. 50, pp. 9-16.

Y. Sano, K. Choi, Y. Korai, I. Mochida, "Selection and Further Activation of Activated Carbons for Removal of Nitrogen Species in Gas Oil as a Pre-Treatment for Deep Desulfurization" American Chemical Society, Fuel Chemistry Division Preprints (2003), vol. 48(2), pp. 658-659.

Masaomi Amemiya, Yozo Korai, and Isao Mochida, "Catalyst Deactivation in Distillate Hydrotreating (Part 2) Raman Analysis of Carbon Deposited on Hydrotreating Catalyst for Vacuum Gas Oil," Journal of the Japan Petroleum Institute (2003), pp. 99-104, vol. 46, No. 2.

Edward Furimsky and Franklin E. Massoth, "Deactivation of hydroprocessing catalysts," Catalysis Today (1999), pp. 381-495, vol. 52.

Min "A Unique Way to Make Ultra Low Sulfur Diesel," Korean Journal of Chemical Engineering, vol. 19, No. 4 (2002) pp. 601-606, XP008084152.

Examiner's Report issued in EP Patent Application No. 08858377.8, dated Oct. 4, 2011 (6 pages).

Sara E. Skrabalak et al., "Porous MoS2 Synthesized by Ultrasonic Spray Pyrolysis" J. Am. Chem. Soc. 2005, 127, 9990-9991.

Ki-Hyouk Choi et al., "Preparation and Characterization on nano-sized CoMo/Al2O3 catalyst for hydrodesulfurization," Applied Catalysis A: General 260 (2004) 229-236.

K. Choi et al., "Preparation of CO2 Absorbent by Spray Pyrolysis," Chemistry Letters, vol. 32, No. 10 (2003), p. 924-925.

Y. Okamoto et al., "A study on the preparation of supported metal oxide catalysts using JRC-reference catalysts. I. Preparation of a molybdena-alumina catalyst. Part 1. Surface area of alumina," Applied Catalysis A: General 170 (1998), p. 315-328.

Messing et al., "Ceramic Powder Synthesis by Spray Pyrolysis," Journal of the American Ceramic Society, vol. 76, No. 11, pp. 2707-2726 (1993).

Okuyama et al., "Preparation of nanoparticles via spray route," Chemical Engineering Science, vol. 58, pp. 537-547 (2003).

Uematsu et al., "New application of spray reaction technique to the preparation of supported gold catalysts for environmental catalysis," Journal of Molecular Catalysis A: Chemical 182-183, pp. 209-214 (2002).

Mizushima et al., "Preparation of Silica-supported Nickel Catalyst by Fume Pyrolysis: Effects of Preparation Conditions of Precursory Solution on Porosity and Nickel Dispersion," Journal of the Japan Petroleum Institute, vol. 48, No. 2, pp. 90-96 (2005).

Tim Old and Jeff Vander Lan, ConocoPhillips S ZorbTM Sulfur Removal Technology: A Proven Solution to the ULSG Challenge, ERTC 9th Annual Meeting, Prague, pp. 1-16, presented at the ERTC 9th Annual Meeting, Refining & Petrochemical, Apr. 27-29, 2005, Kuala Lumpur, Malaysia.

Gary, J. H., "Petroleum Refining Technology and Economics," 5th ed., CRC Press, 463 pgs (2007).

EP Examiner's Report issued in EP Patent Application No. 08857250.8, dated Jun. 28, 2011 (13 pages).

Gao et al., "Adsorption and reduction of NO2 over activated carbon at low temperature," Fuel Processing Technology 92, 2011, pp. 139-146, Elsevier B.V.

M. Te et al., "Oxidation reactivities of dibenzothiophenes in polyoxometalate/H2O2 and formic acid/H2O2 systems," Applied Catalysis A: General 219 (2001), p. 267-280.

P. De Filippis et al., "Oxidation Desulfurization: Oxidation Reactivity of Sulfur Compunds in Different Organic Matrixes," Energy & Fuels, vol. 17, No. 6 (2003), p. 1452-1455.

K. Yazu et al., "Oxidative Desulfurization of Diesel Oil with Hydrogen Peroxide in the Presence of Acid Catalyst in Diesel Oil/Acetic Acid Biphasic System," Chemistry Letters, vol. 33, No. 10 (2004), p. 1306-1307.

S. Otsuki et al., "Oxidative Desulfurization of Light Gas Oil and Vacuum Gas Oil by Oxidation and Solvent Extraction," Energy & Fuels, vol. 14, No. 6 (2000), p. 1232-1239.

J.T. Sampanthar et al., "A novel oxidative desulfurization process to remove refractory sulfur compounds from diesel fuel," Applied Catalysis B: Environmental 63 (2006), p. 85-93.

A. Chica et al., "Catalytic oxidative desulfurization (ODS) of diesel fuel on a continuous fixed-bed reactor," Journal of Catalysis, vol. 242 (2006), p. 299-308.

K. Yazu et al., "Immobilized Tungstophosphoric Acid-catalyzed Oxidative Desulfurization of Diesel Oil with Hydrogen Peroxide," Journal of Japan Petroleum Institute, vol. 46, No. 6 (2003), p. 379-382.

S. Murata et al., "A Novel Oxidative Desulfurization System for Diesel Fuels with Molecular Oxygen in the Presence of Cobalt Catalysts and Aldehydes," Energy & Fuels, vol. 18, No. 1 (2004), p. 116-121.

I. Mochida et al., "Kinetic study of the continuous removal of Sox on polyacrylonitrile-based activated carbon fibres," Fuel, vol. 76, No. 6 (1997), p. 533-536.

I. Mochida et al., "Removal of Sox and Nox over activated carbon fibers," Carbon, vol. 38 (2000), p. 227-239.

N. Shirahama et al., "Mechanistic study on adsorption and reduction of NO2 over activated carbon fibers," Carbon, vol. 40 (2002), p. 2605-2611.

E. Raymundo-Pinero et al., "Temperature programmed desorption study on the mechanism of SO2 oxidation by activated carbon and activated carbon fibres," Carbon, vol. 39 (2001) p. 231-242.

Mochida et al., "Adsorption and Adsorbed Species of SO2 during its Oxidative Removal over Pitch-Based Activated Carbon Fibers," Energy & Fuels, vol. 13, No. 2, 1999, pp. 369-373.

Zhou et al., "Deep Desulfurization of Diesel Fuels by Selective Adsorption with Activated Carbons," Prepr. Pap.-Am. Chem. Soc., Div. Pet, Chem, 2004, 49(3), pp. 329-332.

Adschiri et al. "Hydrogenation through Partial Oxidation of Hydrocarbon in Supercritical Water", published in Int. J. of the Soc. of Mat. Eng. for Resources, vol. 7, No. 2, pp. 273-281, (1999).

Adschiri et al. "Catalytic Hydrodesulfurization of Dibenzothiophene through Partial Oxidation and a Water-Gas Shift Reaction in Supercritical Water", published in Ind, Eng. Chem. Res., vol. 37, pp. 2634-2638, (1998).

Sato et al. "Upgrading of asphalt with and without partial oxidation in supercritical water", published in Science Direct, Fuel, vol. 82, pp. 1231-1239 (2003).

Kishita, A. et al., "Upgrading of Bitumen by Hydrothermal Visbreaking in Supercritical Water with Alkai," Journal of the Japan Petroleum Institute, 2003, 215-221, 46 (4).

Choi et al., "Petroleum Upgrading and Desulfurizing Process," U.S. Appl. No. 13/009,062, filed Jan. 19, 2011.

Choi et al., "Removal of Sulfur Compounds from Petroleum Stream," U.S. Appl. No. 12/825,842, filed Jun. 29, 2010.

* cited by examiner

CATALYST TO ATTAIN LOW SULFUR GASOLINE

RELATED APPLICATIONS

This application claims priority to U.S. Provisional Patent Application Ser. No. 61/030,352, filed on Feb. 21, 2008, which is incorporated by reference in its entirety.

BACKGROUND OF THE INVENTION

Technical Field of the Invention

This invention generally relates to the field of hydroprocessing catalysts for treatment of hydrocarbons. In particular, the present invention is directed to a process for preparing a catalyst useful for the hydrodesulfurization of gasoline feedstock with minimal loss of octane rating.

Description of the Prior Art

In the petroleum industry, it is common for gas oils, particularly middle distillate petroleum fuels, to contain sulfur species. Engines utilizing petroleum based fuels that include sulfur produce emissions of nitrogen oxide, sulfur oxide and particulate matter. Government regulations have become more stringent in recent years with respect to allowable levels of the potentially harmful emissions.

Many countries around the world currently limit allowable sulfur content in gasoline fuels to less than 50 ppm, and in some cases as low as 20 ppm. As environmental concerns grow, allowable sulfur content in gasoline fuels may soon be limited to 10 ppm or less. Thus, catalysts and processes for the production of gasoline fuels having a sulfur content of 10 ppm or less are needed.

Various methods have been proposed to reduce sulfur levels in gas oils. However, there are disadvantages associated with previously proposed methods. For example, hydrodesulfurization of fuel in catalytic reactors has been proposed, however the process frequently requires two or more reactors operating in series under severe reaction conditions; i.e., low flow rates and high temperatures, pressures and hydrogen consumption conditions. The severe reaction conditions are necessary to overcome strong inhibition by refractory sulfur and nitrogen compounds against hydrodesulfurization. Therefore, strict conditions are also imposed on apparatus design, thereby typically incurring high construction costs.

Alternatively, various organic and inorganic adsorbents have been proposed to effectuate adsorptive removal of sulfur compounds. Examples of previously proposed adsorbents include silica, alumina, zeolite, activated carbon, activated carbon-based fiber materials and spent hydrodesulfurization catalyst. However, the volumetric adsorption capacity for these adsorbents was often too low, and breakthrough of sulfur compounds into the fuel product was often too rapid. Also, inorganic adsorbents typically require high temperature treatment for regeneration, which is not practical for stable and continuous operation, and the adsorption regeneration cycle can be too frequent, which makes efficient operation difficult. Further, these adsorbents often can be expensive and susceptible to attrition. Fine particles produced due to attrition between adsorbent particles can cause plugging and high pressure drop, each of which can shorten the run length of an adsorption process.

Catalytic desulfurization is one method for removal of sulfur of hydrocarbons. Generally, catalytic desulfurization takes place at elevated temperature and pressure in the presence of hydrogen. At the elevated temperatures and pressures, catalytic desulfurization can result in the hydrogenation of other compounds, such as for example, olefin compounds, which may be present in the petroleum fraction which is being desulfurized. Hydrogenation of olefin products is undesirable as the olefins play an important role providing higher octane ratings (RON) of the feedstock. Thus, unintentional hydrogenation of olefin compounds during desulfurization may result in a decreased overall octane rating for the feedstock. If there is significant loss of octane rating during the hydrodesulfurization of the hydrocarbon stream, because of saturation of olefin compounds, the octane loss must be compensated for by blending substantial amounts of reformate, isomerate and alkylate into the gasoline fuel. The blending of additional compounds to increase the octane rating is typically expensive and thus detrimental to the overall economy of the refining process.

Additionally, catalytic hydrodesulfurization can result in the formation of hydrogen sulfide as a byproduct. Hydrogen sulfide produced in this manner can recombine with species present in the hydrocarbon feed, and create additional or other sulfur containing species. Olefins are one exemplary species prone to recombination with hydrogen sulfide to generate organic sulfides and thiols. This reformation to produce organic sulfides and thiols can limit the total attainable sulfur content which may be achieved by conventional catalytic desulfurization.

Alumina is a common support material used for catalyst compositions, but has several disadvantages in the desulfurization of petroleum distillates. Alumina, which is acidic, may not be well suited for the preparation of desulfurization catalysts with high loading of active catalytic species (i.e., greater than 10 weight %) for catalytically cracked gasoline. Acidic sites present on the alumina support facilitate the saturation of olefins, which in turn results in the loss of octane rating of gasoline. Additionally, recombination of the olefin with hydrogen sulfide, an inevitable result of hydrodesulfurization, produces organic sulfur compounds. Furthermore, basic species present in the feedstock, such as many nitrogen containing compounds, can bind to acidic sites on the surface of the alumina and the catalyst, thereby limiting the number of surface sites which are available for sulfur compounds for desulfurization. Furthermore, basic species present in the feedstock, such as many nitrogen containing compounds, can bind to acidic sites on the surface of the alumina and the catalyst, thereby limiting the number of surface sites which are available for sulfur compounds for desulfurization. At the same time, nitrogen containing compounds having aromatic rings are easily transformed into coke precursors, resulting in rapid coking of the catalyst. Additionally, high dispersion of the metal is difficult to enhance with an alumina support due to the strong polarity and the limited surface area of the alumina. Exemplary commercially available hydrotreating catalysts employing an alumina support include, but are not limited to, $CoMo/Al_2O_3$, $NiMo/Al_2O_3$, $CoMoP/Al_2O_3$, $NiMoP/Al_2O_3$, $CoMoB/Al_2O_3$, $NiMoB/Al_2O_3$, $CoMoPB/Al_2O_3$, $NiMoPB/Al_2O_3$, $NiCoMo/Al_2O_3$, $NiCoMoP/Al_2O_3$, $NiCoMOB/Al_2O_3$, and $NiCoMoPB/Al_2O_3$, (wherein Co is the element cobalt, Ni is nickel, Mo is molybdenum, P is phosphorous, B is boron, Al is aluminum and O is oxygen).

In addition, prior art methods suffer in that the preparation of desulfurization catalysts having high metal loading with high dispersion is generally difficult. For example, many prior art catalysts are prepared by a conventional impregnation method wherein the catalysts are prepared by mixing the support materials with a solution that includes metal compounds, followed by filtration, drying, calcination and activation. However, catalyst particles prepared by this method are generally limited in the amount of metal which can be loaded to the support material with high dispersion, which generally does not exceed approximately 25% by weight of the metal oxide to the support material. Attempts to achieve higher loading of the metal to support materials having a relatively high surface area, such as silicon dioxide, typically result in the formation of aggregates of metallic compounds on the surface of the support. Activated carbon has much higher surface area and weaker polarity than conventional catalyst supports, such as for example, alumina and silica. This provides improved performance in the desulfurization of catalytically cracked gasoline because both olefin saturation and recombination of hydrogen sulfide with the olefin are suppressed over activated carbon support. However, weaker polarity and a relatively high hydrophobicity make activated carbon difficult to load large amount of active metallic species, such as molybdenum oxide.

Thus, catalyst compositions and methods for preparing catalysts useful for the removal of sulfur species from petroleum based products are needed. Specifically, methods for the production of the catalyst compositions which include support materials having high surface area and high catalyst loading with high dispersion for the desulfurization of petroleum products are desired.

SUMMARY OF THE INVENTION

A hydrodesulifurization catalyst composition, a method for the preparation of the catalyst composition and a method for preparing low sulfur gasoline fuel from catalytically cracked gasoline are provided. The catalyst particles include at least one active metal and a support material.

In one aspect, a method for preparing a hydrodesulfurization catalyst is provided. The method includes the steps of preparing a mixture that includes at least one metal salt, a catalyst support and water, wherein the metal salt is selected from a salt of molybdenum, chromium and tungsten. The mixture is prepared under vacuum. The mixture can also be prepared in an inert atmosphere. Water is removed from the mixture and the catalyst particles are collected, The particles are calcined by heating the particles to a temperature of greater than about 200° C. The calcined catalyst particles are then partially sulfided by contacting the catalyst particles with a gas stream having up to about 5% by volume hydrogen sulfide in the presence of hydrogen.

In certain embodiments, the mixture can include a second metal salt wherein the metal is selected from the group consisting of iron, ruthenium, osmium, cobalt, rhenium, iridium, nickel, palladium and platinum. The molar ratio of the first metal to the second metal is between about 1.5:1 and 5:1. In certain embodiments, the mixture can include a molybdenum metal salt and a second metal salt selected from a cobalt metal salt and a nickel metal salt. In certain embodiments, the surface area of the catalyst support material is greater than about 500 m²/g. In certain embodiments, the oxide form of the first metal is present in an amount of between about 10% and 30% by weight of the catalyst support material.

In another aspect a method of preparing a desulfurization catalyst is provided. The method includes the steps of preparing a first mixture that includes a molybdenum salt, a catalyst support and water, wherein the first mixture is under vacuum. The water is removed from the first mixture to produce a catalyst precursor. A second mixture is prepared that includes a metal salt selected from a nickel or cobalt salt, water and the catalyst precursor, which was prepared from the first mixture. Water is removed from the second mixture to produce catalyst particles. The catalyst particles are calcinated by heating the particles to a temperature of greater than about 200° C. and the calcinated catalyst particles are partially sulfided by contacting the catalyst particles with a gas stream comprising up to about 5% by volume hydrogen sulfide.

In another aspect, a catalyst composition is provided. The catalyst composition includes an activated carbon catalyst support material, a first metal selected from the group consisting of chromium, molybdenum and tungsten, and a second metal selected from the group consisting of iron, ruthenium, osmium, cobalt, rhenium, iridium, nickel, palladium and platinum. The first metal is present in its oxide form in an amount of between 10 and 30 weight % of the support material and the second metal is present in an amount of between about 1 and 10% by weight of the support material. Both the first and second metals are present in the oxide form of the metal.

In another aspect, a method for the hydrodesulfurizing a petroleum based hydrocarbon distillate is provided. The method includes contacting a petroleum hydrocarbon distillate with hydrogen gas in the presence of a hydrodesulfurization catalyst, wherein the hydrodesulfurization catalyst comprises an activated carbon catalyst support material, a first metal selected from the group consisting of chromium, molybdenum and tungsten, a second metal selected from the group consisting of iron, ruthenium, osmium, cobalt, rhenium, iridium, nickel, palladium and platinum, and the hydrodesulfurization catalyst that includes between about 10 and 30% by weight of the first metal and between about 1 and 10% by weight of the second metal.

DETAILED DESCRIPTION OF THE INVENTION

Gasoline hydrodesulfurization catalysts preferably have high hydrodesulfurization activity and low hydrogenation activity of olefins. Conventional methods for the preparation of nickel-molybdenum (NiMo) or cobalt-molybdenum (CoMo) catalysts supported on activated carbon can result in catalysts having less than about 5% by weight $MoO_3$, and non-uniform aggregates of the metal oxide. The drawbacks associated with the conventional methods for preparing catalysts on activated carbon limit the catalytic performance in the desulfurization of hydrocarbons, and particular in the desulfurization of catalytically cracked gasoline. Preferably, the metal oxide forms a thin uniform layer on the surface of the support material. Additionally, it is preferred that the metal is present in an amount greater than approximately 15% by weight of the support material to enhance catalytic conversion of sulfur compounds.

Catalyst

The catalyst includes a support material and at least one active metal.

The catalyst support can be selected from activated carbon, activated carbon fiber, carbon black, activated carbon fabric, activated carbon honeycomb, metal oxides including silicon dioxide, titanium dioxide, zirconium dioxide, and the like, and combinations thereof. Activated carbon and carbon black are believed enhance the activity of the metal species due to relatively weak polarity and relatively high surface area. In certain embodiments, the surface area of the support material can be at least about 200 m²/g. In other embodiments, the surface area can be at least about 300 m²/g. In preferred embodiments, the surface area can be at least about 500 m²/g, more preferably at least about 1000 m²/g. In certain embodiments, the pore diameter can be between about 0.5 nm and 5 nm. In certain other embodiments, the pore diameter can be between about 1.5 nm and 4 nm.

The catalyst composition can at least one active metal selected from Group VIB of the periodic table, which includes, chromium, molybdenum and tungsten. The catalyst can also include at least one promoter metal selected from the Group VIIIB metals of the periodic table, which include iron, ruthenium, osmium, cobalt, rhenium, iridium, nickel, palladium and platinum, as the active component. In certain embodiments, the catalyst composition can include more than one Group VIIIB metal. In a preferred embodiment, the catalyst can include molybdenum. In certain other preferred embodiments the catalyst composition can include either cobalt or nickel. Optionally, at least a portion of the metal can be present as a metal sulfide. Alternatively, at least a portion of the metal can be present as a metal oxide.

The group VIB metal can be present in oxide form and can be loaded onto the support material in an amount exceeding approximately 10% by weight of the support material. In other embodiments, the group VIB metal oxide can be loaded onto the support material in an amount exceeding approximately 15% by weight of the support material. In yet other embodiments, the group VIB metal oxide can be loaded onto the support material in an amount exceeding approximately 20% by weight of the support material. In yet other embodiments, the group VIIB metal oxide can be loaded onto the support material in an amount exceeding approximately 25% by weight of the support material. In certain preferred embodiments, the metal oxide can be $MoO_3$.

The group VIIIB metal can be present in oxide form and can be loaded onto the support in an amount exceeding approximately 1% by weight of the support material. In other embodiments, the group VIIIB metal oxide can be present in an amount between about 1% and 10% by weight of the support material. In other embodiments, the group VIIIB metal oxide can be present in an amount between about 4% and 10% by weight of the support material.

Known catalyst promoters can also be added to the catalyst composition. Exemplary catalyst promoters can include, but are not limited to, boron and phosphorous.

The catalyst composition can be subjected to calcining or similar thermal treatment, which can be beneficial by increasing the thermal stability and metal dispersion of the catalyst composition. Generally, during calcination, the particles are heated in an oxygen containing environment to temperatures ranging from about 200° C.-800° C. The process can be carried out by placing the composition in a process heater, at the desired temperature, with a flowing oxygen containing gas, such as for example, atmospheric air. The process heater can be heated to the designated temperature or temperature range, maintained at the designated temperature for a defined time period, and then cooled to room temperature. The calcination of the catalyst composition can include heating the catalyst particles at a defined ramp rate.

Prior to use, the catalyst can be exposed to a sulfur source for the preparation of surface bound metal sulfides. The sulfur source can be contacted with the catalyst in either liquid or; gaseous form. In certain embodiments, the catalyst particles can be contacted with a hydrogen gas mixture that includes hydrogen sulfide. In one exemplary embodiment, the sulfur source is a hydrogen gas stream that can include up to approximately 10% hydrogen sulfide by volume. Alternatively, the hydrogen gas stream includes between approximately 1 and 5% hydrogen sulfide by volume. In certain embodiments, the catalyst particles can be contacted with a sulfur source at a temperature of greater than about 200° C., preferably at temperatures greater than about 300° C.

Catalyst Preparation

In another aspect, a method for preparing a hydrodesulfurization catalyst composition from an aqueous solution is provided. Generally, activated carbon species are hydrophobic. Thus, preparation of catalysts using activated carbon supports generally requires the use of organic solvents to reduce hydrophobicity of the carbon support surface, or to enhance the affinity of the metal species to the surface of the activated carbon. Methods of preparing catalysts employing carbon supports from aqueous solutions generally result in low catalyst loading. A catalytic support material can be placed under vacuum to facilitate the removal of trapped solvent and/or moisture. In certain embodiments, the catalytic support material can be heated under vacuum. Exemplary conditions for the catalyst preparation include heating the catalytic support material to a temperature of up to about 100° C. and applying vacuum up to a pressure of approximately 1 torr or less. Without being bound to any specific theory, it is believed that treating the catalytic support material under vacuum can facilitate diffusion of the metal species into the small pores.

A mixture can be prepared by adding a metal salt solution that includes at least one metal salt and water, to the support under vacuum. The metal salt solution can be added to the catalyst support material slowly. Optionally, in certain embodiments, it may be advantageous that the metal salt solution is added dropwise to the catalyst support material.

Exemplary catalytic support materials can include, but are not limited to, activated carbon, activated carbon fiber, carbon black, activated carbon fabric, activated carbon honeycomb, metal oxides including silicon dioxide, titanium dioxide, zirconium dioxide, and the like, and combinations thereof. In a preferred embodiment, the catalyst support material is an activated carbon species.

In certain preferred embodiments, the catalyst support material can be neutral or basic, when compared to the gamma-type alumina, which is frequently used as the support material for desulfurization catalysts. For use in the desulfurization of hydrocarbon streams, in particular catalytically cracked gasoline, which can typically include olefins and produce hydrogen sulfide as a product of the hydrodesulfurization, the catalyst support material is preferably not acidic. Without wishing to be bound by any theory, it is believed that acidic sites on a support material can facilitate olefin saturation, which can result in RON loss, and recombination of hydrogen sulfide with olefin, which limit attainable sulfur content of product. Any RON loss must then be compensated for by the addition of expensive alkylates, isomerates and/or other chemicals.

Catalyst support materials having a high surface area allow for greater loading of the active species which provide the catalytic activity. Thus, catalyst support materials having a relatively high surface area are preferred. In other embodiments, the catalyst support material surface area can be at least about 200 $m^2$/g. In certain embodiments, the catalyst support material surface area is at least about 300 $m^2$/g. Preferably, the catalyst support material surface area is at least about 500 $m^2$/g. Even more preferably, the catalyst support material has a surface area of at least about 1000 $m^2$/g.

The catalyst support material particles can have a diameter of between about 0.5 and 10 mm, preferably between about 1 and 8 mm in diameter, and even more preferably approximately 5 mm in diameter. In certain other embodiments, the catalyst support material particles can have a pore diameter of less than about 15 nm. In yet other embodiments, the catalyst support material particles can have a pore diameter of less than about 10 nm.

Exemplary catalyst support materials having low acidity and high surface area include activated carbon species. Activated carbons are exemplary catalyst support materials that can be advantageously used to prepare hydrodesulfurization catalysts, according to the methods described herein.

Exemplary metal salts can include salts of the Group VIB metals of the periodic table, which include chromium, molybdenum and tungsten. In certain embodiments, exemplary metal salts can include salts of the VIIIB metals, which include iron, ruthenium, osmium, cobalt, rhenium, iridium, nickel, palladium and platinum. In certain embodiments, the metal salt includes a metal that is preferably selected from cobalt molybdenum and nickel. In other embodiments, more than one metal salt can be added to the solution, wherein at least one of the metals is selected from cobalt, molybdenum and nickel. Preferably, the metal salt(s) and catalyst support material are sufficiently mixed to produce a homogeneous aqueous solution that contains the metal salt and the support material. Specific examples of metal salts which can be employed according to the methods disclosed herein include, but are not limited to, $(NH_4)_6Mo_7O_{24}.4H_2O$, $Ni(NO_3)_2.6H_2O$, $CoNO_3)_2.6H_2O$, $NiCl_2.6H_2O$, $CoCl_2.6H_2O$, $(NH_4)_6H_2W_{12}O_{40}.XH_2O$ (ammonium metatungstate), and the like. Nickel and cobalt acetates can also be used as precursors, although, for purposes of solubility, organic solvents may be required. Optionally, finely ground particles of molybdenum trioxide can also be used to prepare a colloidal precursor solution.

The mixture can be mechanically mixed to ensure adequate interaction between the catalyst support material and the metal salts. Mixing can be accomplished by known means, such as for example, by ultrasonic vibration, by mechanical stirring means, or other means known in the art. In certain embodiments, a mixture that includes water, catalyst support material and the metal salt can be mixed for at least about 15 minutes. In other embodiments, the mixture can be mixed for a period of at least about 1 hour. In yet other embodiments, the mixture can be mixed for a period of between about 4 and 6 hours.

After mixing, the mixing vessel can be exposed to atmospheric conditions and the water can be removed. Optionally, the mixture can be heated to assist in the evolution of water and gases. In certain other embodiments, the solids can be collected by filtration. In certain preferred embodiments, the mixture can be first heated, followed by removal of the remained of the liquids under vacuum. In other embodiments, the mixture is heated to a temperature of between about 40° C. and 150° C., preferably between about 60° C. and 130° C. In certain embodiments, the mixture is heated to a temperature of greater than about 100° C. In certain other embodiments, the mixture is heated to a temperature of approximately 120° C. In certain embodiments, the mixture is stirred while the catalyst is heated. In certain embodiments, liquids can be removed under a vacuum of up to about 1 torr. In certain preferred embodiments, remaining liquids can be removed under a vacuum of approximately 1 torr, for a period of approximately 16 hours.

The particles can be calcinated after collection and drying at a temperature of between about 200° C. to 600° C. In certain embodiments, the catalyst particles are calcinated at a temperature between about 200° C. and 500° C. In preferred embodiments, the catalyst particles are calcinated at a temperature of between about 250° C. and 350° C. Optionally, the catalyst particles can be calcinated at a temperature of approximately 300° C., The catalyst particles can be calcinated for between about 30 minutes and 8 hours, preferably for between 3-6 hours. In an exemplary embodiment, the catalyst particles are calcinated at a temperature of approximately 320° C. for a period of approximately 3 hours. Optionally, calcination can be done in an oxygen containing environment, preferably in air. Without being bound to any theory, calcination in air is believed to form the oxidic precursor form of the metal as the active phase of the catalyst.

After being dried and collected, the catalyst particles can be contacted with a sulfur containing source. The sulfur containing source can be a gas or liquid source. In certain embodiments, the catalyst particles can be contacted with a hydrogen gas mixture that includes hydrogen sulfide. Optionally, the sulfur source is a hydrogen gas stream which can include up to approximately 10% hydrogen sulfide by volume. Alternatively, the hydrogen gas stream includes between approximately 1 and 5% hydrogen sulfide by volume. In certain embodiments, the catalyst particles can be contacted with a sulfur source at a temperature of greater than about 100° C., preferably at temperatures greater than about 200° C., and most preferably at a temperature greater than about 300° C. In an exemplary embodiment, the catalyst particles can be contacted with a sulfur containing source at a temperature of approximately 360° C. Preferably, the sulfur containing hydrogen gas can contact the catalyst particles for an extended period of time, such as for example, at least one hour, or more preferably, at least two hours. The effluent leaving the catalyst during pre-sulfiding has sulfur content lower than that of the effluent being fed, thus showing active sulfidation of the oxidic form of the catalyst particles.

Catalytic Desulfurization

In one aspect, a method of producing a reduced sulfur gasoline is provided.

The method includes the steps of contacting a gasoline feedstock prepared by the catalytic cracking gasoline with a desulfurization catalyst wherein the desulfurization catalyst includes an activated carbon support having one or more of a Group VIB and a Group VIIIB metal sulfide adsorbed on the surface.

The hydrocarbon feedstock can be a derivative from crude petroleum oil, oil sands, oil shale, or oil derived from coal or wood. Generally, any hydrocarbon oil that includes sulfur or sulfur impurities, can be used as a suitable hydrocarbon feedstock. Typically, modern gasoline is a blend of several different refinery streams, including reformate, straight run naphtha, catalytically cracked gasoline, coker naphtha, isomerate, alkylate and oxygenate. The main source of sulfur content typically comes from FCC gasoline, coker naphtha and straight run naphtha obtained from high sulfur crudes.

Desulfurization can take place in a reactor, such as for example, a fixed bed, packed bed, slurry bed or fluidized bed reactor, which can be charged with an activated carbon supported desulfurization catalyst, which can be prepared as described herein. Typically, the gasoline feedstock, hydrogen gas and the catalyst are contacted in a reactor, typically at an elevated temperature. The desulfurization can take place at a temperature of at least about 200° C. In certain embodiments, the desulfurization takes place at a temperature of between about 250° C. and 400° C. Typically pressures can be between about 100 and 500 psig. The LHSV can be between about 2 and 10 $h^{-1}$, preferably between approximately 4 and 8 $h^{-1}$. The ratio of hydrogen gas to feedstock can be from about 20-200 L/L, preferably from about 50-150 L/L, more preferably approximately 110-130 L/L.

The overall process can include multiple reactors arranged in parallel. This arrangement allows for continuous operation of the desulfurization process while allowing for the simultaneous regeneration of spent catalyst.

The process and catalyst described herein are advantageously solid heterogeneous catalysts. Because the catalyst is a heterogeneous catalyst, there is no need to determine suitable organic solvents for solubility of the catalyst and hydrocarbonaceous feedstock. Additionally, because the catalyst is a solid material, and dissolution of catalyst in reaction matrix is not an important aspect of the desulfurization, there is never any need to separately remove solvent or dissolved catalyst from the effluent.

EXAMPLES

Example 1 provides a method for the preparation of an exemplary hydrodesulfurization catalyst that includes molybdenum and cobalt on an activated carbon support. An HCN (heavy cat naphtha) fraction distilled from a FRCN (full range cat naphtha) is treated with the hydrodesulfurization catalyst prepared according to the procedure described in Example 1. Example 2 describes the hydrodesulfurization of an H(CN fraction distilled from a FRCN with a commercially available desulfurization catalyst. The results are compared in Table 6.

Example 1

A 20.0 g sample of dried and purified activated carbon (Norit) having specific surface area of 1,065 m$^2$/g and average pore diameter of 2.2 nm was placed in a 200 mL flask. The flask was then evacuated under vacuum for approximately 16 hours to a pressure of approximately 1 torr. An aqueous solution was prepared by dissolving 4.91 g (0.00397 mol) of $(NH_4)_6Mo_7O_{24}\cdot 4H_2O$ (Fluka) to make 20 mL (0.20 M) aqueous solution. The aqueous solution (20 mL) was added dropwise and shaken over a period of about 5 minutes into the flask, which was maintained under vacuum, and mixed for approximately 6 hours. Following mixing, the flask was vented to the atmosphere and heated at a temperature of approximately 120° C. until the atmospheric vaporization of water ceased. The flask was cooled to room temperature and evacuated under vacuum to a pressure of approximately 1 torr for approximately 16 hours.

An 8.02 g (0.00649 mol) sample of $(NH_4)_6Mo_7O_{24}\cdot 4H_2O$ (Fluka) was dissolved in water to make 40 mL (0.16 M) aqueous solution. A 20 mL sample of the aqueous solution was introduced to the flask dropwise over about a 5 minute period with shaking, under vacuum, and mixed for approximately 6 hours. The flask was vented to atmosphere and to a temperature of approximately 70° C. until the atmospheric vaporization of water ceased. The flask was cooled to room temperature and evacuated under vacuum to a pressure of approximately 1 torr for approximately 16 hours again.

A 7.06 g (0.0243 mol) sample of $Co(NO_3)_2\cdot 6H_2O$ (Aldrich Chem.) was dissolved in water to make a 20 mL aqueous solution (1.2 M). The aqueous solution (20 mL) was introduced to the flask dropwise over about a 5 minute period with shaking, under vacuum, and mixed for approximately 6 hours. After mixing, the flask was vented to atmosphere and heated to a temperature of approximately 70° C. until the atmospheric vaporization of water ceased. The contents of the flask, a black powder, was transferred to an alumina crucible, heated at a rate of approximately 2° C./min to about 320° C. and calcinated for approximately 3 hours under atmosphere. The catalyst product (29 g) was collected as a black particulate material, consisting of approximately 25 wt % molybdenum oxide and 6.2 wt % cobalt oxide.

A full range cat naphtha (FRCN) feedstock was distilled to produce a heavy cat naphtha (HCN) stream. Properties of feedstocks are outlined in Table 1.

TABLE 1

|  | FRCN | HCN A |
|---|---|---|
| Total Sulfur (ppm) | 2467 | 665 |
| Total Nitrogen (ppm) | 19 | 6 |
| Composition, wt % (ASTM-D5134) | | |
| Aromatics | 22.2 | 36.2 |
| I-Paraffins | 27.3 | 26.9 |
| Napthenes | 14.2 | 17.1 |
| n-Olefins | 10.7 | 6.1 |
| I-Olefins | 12.0 | 4.6 |
| Cyclic-Olefins | 1.5 | 0.5 |
| Total Olefins | 23.5 | 13.4 |
| Paraffins | 5.5 | 4.3 |
| Unidentified | 4.0 | 2.1 |
| Distillation (ASTM-D2887) (° C.) | | |
| 5% | 39 | 91 |
| 10% | 46 | 99 |
| 20% | 57 | 112 |
| 40% | 85 | 127 |
| 50% | 103 | 141 |
| 70% | 143 | 153 |
| 90% | 191 | 173 |

The HCN A catalyst described in Table 1 above was hydrotreated with approximately 10 mL of the catalyst, prepared as described above, which was pre-sulfided at 320° C. for 12 hours with straight run naphtha spiked with dimethyldisulfide to have a sulfur content of approximately 2.5 wt %. Operating conditions for hydrotreatment of HCN are summarized in Table 2.

TABLE 2

|  | Run 29 | Run 30 | Run 31 |
|---|---|---|---|
| Pressure (psig) | 300.0 | 300 | 300 |
| Temperature (° C.) | 280 | 300 | 341 |
| LHSV (h$^{-1}$) | 6.1 | 5.8 | 6.0 |
| H$_2$/Oil (L/L) | 119 | 119 | 119 |

The liquid products from Runs 29, 30 and 31 were analyzed as shown in Table 3.

TABLE 3

|  | Liquid Product from Run 29 | Liquid Product from Run 30 | Liquid Product from Run 31 |
|---|---|---|---|
| Total Sulfur (ppm) | 90 | 30 | 7 |
| Total Nitrogen (ppm) | 1.7 | 1.5 | 1.7 |
| RON Loss | 4.5 | 5.2 | 9.7 |
| Distillation (ASTM D2887) | | | |
| 5% | 91 | 87 | 84 |
| 10% | 96 | 98 | 92 |
| 20% | 105 | 112 | 104 |
| 40% | 123 | 128 | 120 |
| 50% | 132 | 138 | 129 |
| 70% | 150 | 156 | 148 |
| 90% | 171 | 172 | 169 |

Example 2

The HCN A described in Table 1 above was hydrotreated with approximately 10 mL of a commercially available Cobalt/Molybdenum hydrotreating catalyst having an alumina support and a surface area of approximately 250 m$^2$/g. The catalyst was pre-sulfided at 320° C. for approximately 12 hours with straight run naphtha spiked with dimethyldisulfide to have 2.5 wt % sulfur. The operating conditions for hydrotreatment of the HCN fraction are summarized in Table 4.

TABLE 4

|  | Run 4 | Run 5 | Run 6 |
| --- | --- | --- | --- |
| Pressure (psig) | 300 | 300 | 300 |
| Temperature (° C.) | 260 | 300 | 330 |
| LHSV (h$^{-1}$) | 6.1 | 6.1 | 6.0 |
| H$_2$/Oil (L/L) | 118 | 118 | 118 |

Liquid products from Run 4, 5 and Run 6 were analyzed as shown in Table 5.

TABLE 5

|  | Liquid Product from Run 4 | Liquid Product from Run 5 | Liquid Product from Run 6 |
| --- | --- | --- | --- |
| Total Sulfur (ppm) | 571 | 216 | 55 |
| Total Nitrogen (ppm) | 2.4 | 1.4 | 1.3 |
| RON Loss | 0.6 | 1.7 | 5.8 |
| Distillation (ASTM D2887) (° C.) | | | |
| 5% | 89 | 89 | 87 |
| 10% | 96 | 97 | 94 |
| 20% | 105 | 108 | 104 |
| 40% | 122 | 126 | 120 |
| 50% | 130 | 136 | 129 |
| 70% | 148 | 153 | 147 |
| 90% | 169 | 172 | 168 |

The results are presented in comparative form below, wherein the hydrodesulfurization temperatures, resulting sulfur content and percent (%) conversion for the desulfurization of HCN using a the catalyst prepared according to Example 1 (corresponding to Tables 2 and 3, Runs 29, 30 and 31) and the commercially available hydrotreating catalyst prepared according to Example 2 (corresponding to Tables 4 and 5, Runs 4, 5 and 6).

TABLE 6

| Hydrotreatment with Catalyst Prepared According to Example 1 | | | Hydrotreatment with Commercially Available Catalyst According to Example 2 | | |
| --- | --- | --- | --- | --- | --- |
| Temp. (° C.) | Sulfur (ppm) | % Conversion | Temp. (° C.) | Sulfur (ppm) | % Conversion |
| 280 | 90 | 86.5 | 260 | 571 | 14.2 |
| 300 | 30 | 95.4 | 300 | 216 | 67.5 |
| 341 | 7 | 98.9 | 330 | 55 | 91.7 |

As shown in the above tables and summarized in Table 6, hydrotreatment of HCN with the catalyst prepared according to the methods described in Example 1 resulted in a HCN product stream having much lower sulfur contents than the product stream from hydrotreatment with a commercially available alumina supported catalyst. Hydrotreatment at a temperature of 300° C. with the catalyst of Example 1 achieved an HCN product stream having approximately 30 ppm sulfur while similar hydrotreatment with the commercially available alumina supported catalyst of Example 2 produced an HCN product stream having approximately 216 ppm sulfur. Those particular sulfur contents correspond to sulfur conversions of approximately 95.4% and 67.5%, respectively. Desulfurization with the commercially available alumina supported catalyst of Example 2 resulted in a sulfur conversion of approximately 91.9% 340° C. In contrast, ultra deep sulfur conversion was achieved with the catalyst prepared according to Example 1 during hydrotreatment at a temperature of approximately 341° C., wherein the process resulted in a sulfur conversion of approximately 98.9%, and produced a product stream having a sulfur content of approximately 7 ppm.

Loss of RON, estimated by PIONA data, was less for desulfurization with the catalyst of Example 1 than with the commercially available alumina supported catalyst of Example 2 for relatively similar conversion rates. For example, the catalyst of Example 1 had an RON loss of approximately 5.2 at 97.5% sulfur conversion (Run 30, 300° C.) and an RON loss of approximately 9.7 at 98.9% sulfur conversion (Run 31, 341° C.). In contrast, the commercially catalyst of Example 2 had an RON loss of approximately 5.8 at 91.9% sulfur conversion (Run 6, 330° C.). Thus, it is shown that the catalyst prepared according to Example 1 can achieve higher conversion (95.4% desulfurization vs. 91.7% desulfurization), at less severe conditions (300° C. vs, 330° C.), and a lower loss of RON (5.2 vs. 5.8). In addition, it is shown that the catalyst prepared according to Example 1 can achieve much higher sulfur conversion than the commercially available catalyst of Example 2 under severe reaction conditions (98.9% conversion corresponding to a sulfur content of 7 ppm at a desulfurization temperature of 341° C. vs. 91.7% conversion corresponding to a sulfur content of 55 ppm at 330° C.).

As used herein, the terms about and approximately should be interpreted to include any values which are within 5% of the recited value. Furthermore, recitation of the term about and approximately with respect to a range of values should be interpreted to include both the upper and lower end of the recited range.

While the invention has been shown or described in only some of its embodiments, it should be apparent to those skilled in the art that it is not so limited, but is susceptible to various changes without departing from the scope of the invention.

We claim:

1. A method for preparing a hydrodesulfurization catalyst consisting essentially of:
   placing an activated carbon catalyst support that is not acidic under vacuum;
   heating the activated carbon catalyst support under vacuum to a temperature of 100° C.; preparing an aqueous solution comprising molybdenum, cobalt and water;
   introducing, after placing the activated carbon catalyst support under vacuum, the aqueous solution to the activated carbon catalyst support, such that the aqueous solution and activated carbon catalyst support are under vacuum;
   removing the water from the solution under vacuum and collecting the catalyst particles;
   calcinating the catalyst particles by heating the particles to a temperature of greater than 200° C., the calcinated catalyst particles comprising 25% by weight molybdenum oxide and 6.2% by weight cobalt oxide; and partially sulfiding the catalyst particles by contacting the calcined catalyst particles with a liquid hydrocarbon comprising dimethyldisulfide at a temperature of 320° C.;

wherein the support material has a surface area of greater than 1000 m²/g.

2. The method of claim 1 wherein the step of calcinating the solid catalyst particles comprises heating the particle in the presence of oxygen to a temperature greater than about 300° C.

3. The method of claim 1 wherein the molar concentration of the molybdenum and cobalt in solution is between about 0.001 and 1.5 M.

4. The method of claim 1 wherein the molar ratio of molybdenum to cobalt is between 1.5:1 and 5:1.

5. The method of claim 1 wherein the weight ratio of the oxide form of molybdenum to the activated carbon catalyst support that is not acidic is greater than about 15% by weight.

6. The method of claim 1 wherein the weight ratio of the oxide form of cobalt to the activated carbon catalyst support is between about 4% and 10% by weight.

7. The method of preparing a desulfurization catalyst consisting essentially of:

placing an activated carbon catalyst support that is not acidic under vacuum;

heating the activated carbon catalyst support under vacuum to a temperature of 100° C.;

preparing a first mixture comprising $(NH_4)6Mo_7O24.4H_2O$ and water introducing, after placing the activated carbon catalyst support under vacuum, the first mixture to the activated carbon catalyst support, such that the aqueous solution and activated carbon catalyst support are under vacuum;

removing the water under vacuum from the first mixture to produce a solid catalyst precursor;

preparing a second mixture comprising $Co(NO_3)_2.6H_2O$, water and the solid catalyst precursor;

removing the water under vacuum from the second mixture to produce catalyst particles;

calcinating the catalyst particles by heating the particles in an oxygen containing atmosphere to a temperature of 320° C. at a rate of 2° C. per minute; and sulfiding the calcinated catalyst particles to a sulfur content of 2.5% by weight.

8. The method of claim 7 wherein the surface area of the active carbon catalyst support that is not acidic is about 250 m²/g to about 500 m²/g.

* * * * *